United States Patent Office
3,814,646
Patented June 4, 1974

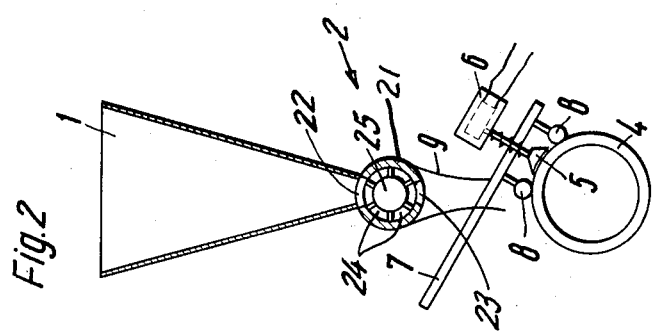
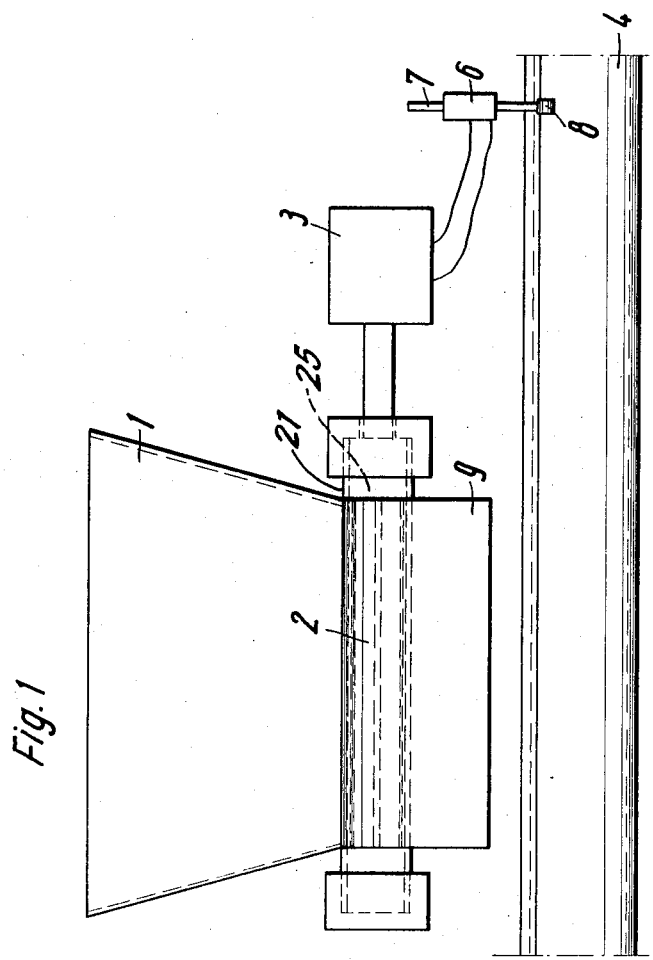

3,814,646
METHOD AND APPARATUS FOR JACKETING A STEEL PIPE
Walter Meyer, Rumeln, and Walter Quitmann, Angermund, Germany, assignors to Mannesmann Aktiengesellschaft, Dusseldorf, Germany
Filed Mar. 29, 1972, Ser. No. 239,059
Claims priority, application Germany, Apr. 5, 1971, P 21 17 618.1
Int. Cl. B65h 81/00
U.S. Cl. 156—195
8 Claims

ABSTRACT OF THE DISCLOSURE

In a method of lining or jacketing a steel pipe having a welding seam along which surface uneveness occurs and whereby an adhesive is provided onto the pipe and a thermoplastic is extruded to form a strip which is helically wound onto the steel pipe for adherence thereto, the pipe turning on its axis while moving axially for the strip winding; the seam is stepwise covered with plastic for smooth interfacing with the strip.

BACKGROUND OF THE INVENTION

The present invention relates to improvements in a method of lining, cladding or jacketing a steel pipe by means of wrapping strip of a thermoplastic material such as polyethylene, helically onto the pipe. Additionally, the invention relates to improvements of pipe jacketing methods such as, for example, disclosed in U.S. Letters Patent No. 3,616,006. This patent discloses enveloping a steel pipe by helically winding a strip of thermoplastic material onto the pipe while an extruded adhesive strip is simultaneously wound onto the pipe for being interposed between pipe and thermoplastic strip. The thermoplastic strip is likewise made by extrusion. The extruders have stationary position along a production line and provide the respective strips circumferentially tangentially towards the pipe. As the pipe rotates on its axis and moves also axially through the production line, the strips are wound helically onto the pipe indeed.

It was found that a welding seam on the pipe may pose problems to this procedure. The steel pipe may have an axial or a longitudinal welding seam. The bead of that seam establishes some uneveness and irregularity of the surface of the pipe. Therefore, it was found in cases that the plastic layer did not completely lie snug everywhere against the surface of the bead. As a consequence, capillary-like gaps may appear at, on and along the welding seam, which gaps more or less follow the entire extension of the, usually, continuous bead. It was discovered that corroding fluids may enter that gap and actually propagate therein for considerable distance.

DESCRIPTION OF THE INVENTION

It is an object of the present invention to prevent the formation of such gaps between plastic cladding strip and steel pipe along and adjacent to the bead of a welding seam. It is another object of the present invention to improve the method as disclosed in U.S. Letters Patent No. 616,006, and to supplement the method and apparatus as disclosed therein. The content of said patent is incorporated by reference.

In acordance with the preferred embodiment of the invention, it is suggested to provide a plastic cover onto the bead of the welding seam prior to lining the pipe by helically winding plastic strip thereon, so as to eliminate surface uneveness of the seam at the strip-pipe interface. In the preferred form, the seam is covered first by powdery or viscous thermoplastic or other plastic material or in form of prefabricated segments. In either case, the deposited material melts upon contact with the hot bead and fills all uneveness thereof in form fitting contour, while offering a smooth outer surface for interfacing with the cladding strip soon to be wound thereon. The seam covering material for control of viscosity upon melting on contact with the heated pipe.

In practicing the method of the invention, the welding seam cover is to be placed in steps on the bead, as the rotating pipe moves axially toward the strip dispensing means for helical cladding. Therefore, the method is practiced by including apparatus which places a cover segment onto a seam section at a length equal to the axial distance of pipe movement for one revolution. The cover dispensing apparatus may include, e.g., powder metering means, triggered in response to detection of proper position of the welding seam in relation to the dispensing apparatus. Alternatively, the apparatus may include tape length metering and cutting means as well as a periodically operated plunger which presses cut segments of the tape onto a bead section whenever the seam is appropriately positioned.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a side view of equipment for stepwise covering sections of a welding seam of rotating and axially advancing pipe with powder;

FIG. 2 illustrates the equipment of FIG. 1 in front view; and

FIGS. 3, 4 and 5 show equipment in sequential operating phases for dispensing, cutting and placing cut segments of a plastic tape onto seam sections of a pipe.

DESCRIPTION OF THE DRAWINGS

Proceeding now to the detailed description of the drawings, in FIGS. 1 and 2, reference numeral 1 refers to a hopper for plastic powder, such as powdery polyethylene etc. The hopper is funnel-shaped and has elongated configuration in that the predominant direction of extension runs parallel to the axial extension of a pipe 4 to be processed.

An elongated rectangular exit opening of hopper 1 is disposed above a metering device 2. The metering device has a tubular elongated housing 21 with an upper elongated slot 22, which is aligned with the hopper, and a lower elongated slot 23 which is aligned with a chute 9. A roll 25 with star-wheel like cross section rotates in housing 21 defining, e.g., six elongated compartments 24 which may individually align with slot 22 or slot 23.

Figure 3:
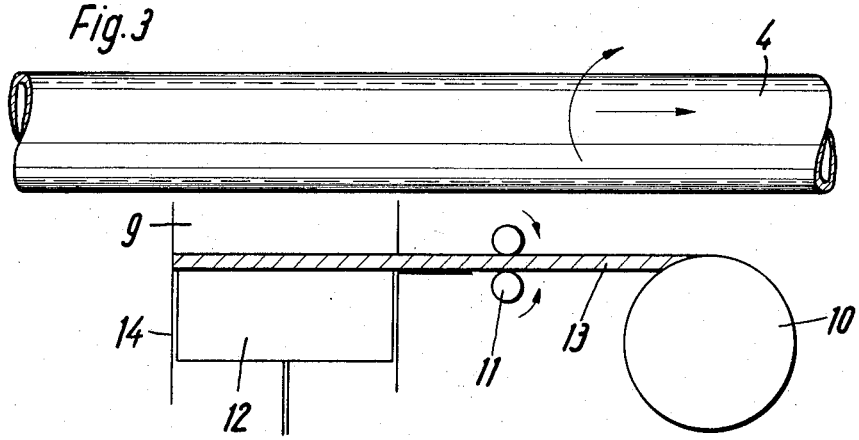

The roll 25 of metering and dispensing device 2 is rotated in steps by electromagnet means 3, each step covering an angular displacement of 60°, i.e. the magnet rotates dispensing device 2 in steps so that one compartment after the other is aligned with the hopper exit, whereby in each such position, one of the compartments also has upside-down position to the pipe underneath and in alignment with chute 9, so that this compartment empties its content through the chute onto the pipe. This emptying will occur whenever the particular compartment 24 is being rotated towards the 6 o'clock position; whereupon an axially extending powder strip is laid onto the pipe surface underneath.

The timing of this movement of roll 25 of dispenser 2 is controlled by a contact feeler 5, scanning the surface of pipe 4 as it advances and rotates. Feeler 5 triggers a pulse source 6 whenever the feeler senses the welding seam. Feeler 5 and pulse generator 6 are disposed on a lever 7 which bears on the pipe surface by means of rolls 8. The generator 6 controls electromagnet 3 for turning roll 25 by one 60° step whenever a segment of the longitudinal seam is directly underneath the dispenser chute 9.

During operation, pipe 4 rotates and also advances axially toward a strip dispensing device (e.g. an extruder) disposed to the left of FIG. 1 and winding strip helically onto the pipe. The entire equipment as shown in the above mentioned patent (No. 3,616,006) may be disposed immediately to the left of the illustration in FIG. 1. Pursuant to the rotation, the axial welding seam on the pipe lifts briefly the feeler 5, once for each revolution and triggering pulse generator 6 accordingly. Generator 6 controls magnet 3 to rotate dispensing roll 25 by 60°. The feeler 5 is particularly positioned to accommodate for slight operation delays, so that the one compartment begins to pour its content onto the pipe when, in fact, the seam is directly underneath. The rotation of roll 25 with compartments 24 of dispenser 2, must be relatively fast in relation to the continuous rotation of pipe 4, so that the particular compartment turning towards the 6 o'clock position, empties its content completely onto the seam while the seam is still in about its 12 o'clock position. As a consequence, the powder is placed onto the seam in an elongated, strip-like configuration. The dimensions of the compartments are chosen, so that a seam section underneath an emptying compartment is, in fact, completely covered by the amount of powder therein.

As the powdery plastic hits the hot metal of the pipe and seam, it melts and covers the seam. The pipe, particularly the welding seam may still be hot because, for example, welding just precedes the process presently described. The now liquidus plastic flows into all surface unevenesses, grooves etc., in and near the welding bead surface, thus, closing any otherwise available capillary ducts or the like. The outwardly oriented surface of the cover for the bead is smoother than the bead and merges in the steel pipe surface due to liquidity.

As pipe 4 continues to rotate, it also advances axially and, as stated above, the axial length of the dispensing equipment is chosen, so that after one revolution the pipe has also advanced so that the end of the cover strip just laid, is just about to leave the range of the next compartment of roller 25. Now, this next compartment of dispenser 2, when aligned with slot 23 and chute 9, empties onto this next welding bead section and continues the cover strip as has been laid onto the seam thus far. The placement of strip segments onto sequential seam sections should be controlled accurately so that there is neither an axial gap in between two sequential cover segments, nor should they overlap. The pipe is then jacketed by helical strip as described, for example, in the patent referred to repeatedly above, or otherwise.

The equipment above is particularly designed for stepwise covering the bead of an axial welding seam by powder that melts on contact. Alternatively, a liquidus plastic can be used. Still alternatively, the bead of a helical seam can be covered by positioning the hopper and dispensing device 25 obliquely to the pipe's axis, corresponding to the pitch of the welding seam helix. A pipe contour matching chute is then disposed underneath roller 25 of the dispensing device. A segment of, for example, 90° helical extension can be covered in each step so that the dispensing device is triggered for each 90° angle displacement of pipe 4 during its rotation, there will be four feelers such as 5 accordingly. It may be more convenient for a helical seam to lay a powder strip on a continuous basis, through a small, funnel-shaped dispenser. Due to concurring rotation and axial advance of the pipe, the helical welding seam can be made to stay underneath the hopper.

Figure 4:
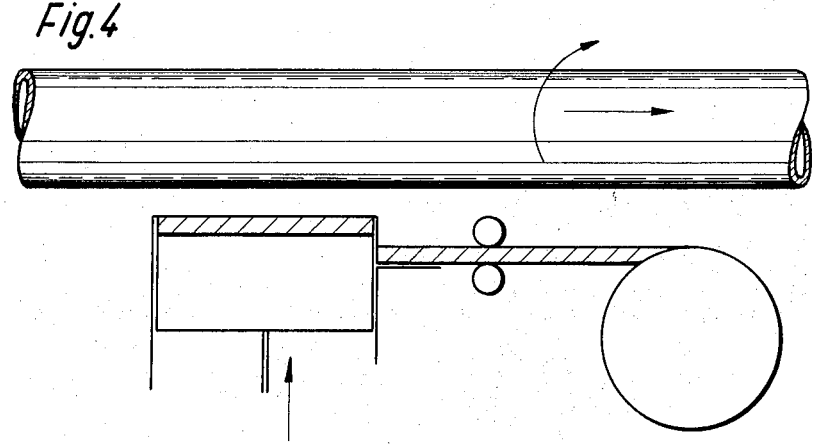
Figure 5:
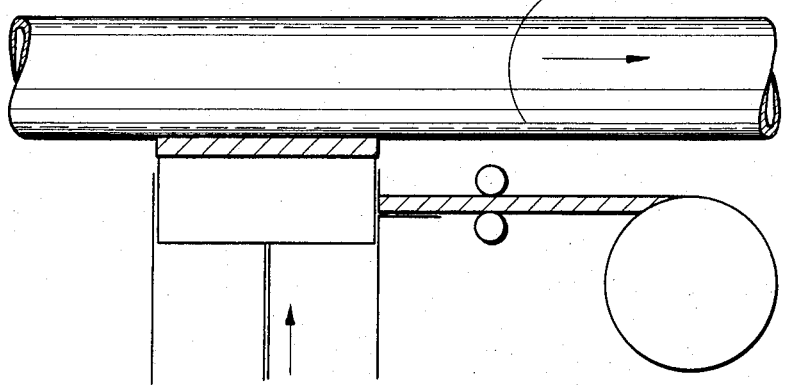

FIGS. 3 to 5 illustrate an alternative example of the preferred embodiment of the invention. A supply drum 10 dispenses plastic strip or tape 13 at a rate faster than the pipe advances parallel to tape advance along the pipe. The tape 13 is moved by means of rolls 11 and enters a tape length metering device 14 through a gap. A feeler (not shown) at the opposite end of metering device 14 stops rolls 11 when a particular length of tape has been reeled off the supply drum and lies on a plunger 12.

A welding bead position sensing device as described above (5, 6, 7, 8) is also provided here, triggering a plunger advance mechanism (e.g. a solenoid, magnet etc.) for plunger 12 to advance rapidly, severing a segment from tape 13 and forcing that tape segment onto the now properly aligned seam portion. As the pipe is hot that tape segment melts and covers intimately the particular section of the seam as described above. The punch or plunger 12 may have slightly concave front face matching the curved contour of the pipe. After the plunger has retracted, a new segment of tape is reeled into the dispenser 14.

The invention is not limited to the embodiments described above but all changes and modifications thereof not constituting departures from the spirit and scope of the invention are intended to be included.

We claim:

1. In a method of jacketing, lining or cladding a steel pipe having a welding seam along which surface unevenness occurs and whereby an adhesive is provided onto the pipe and is thermoplastic is extruded to form a strip which is helically wound onto the steel pipe for adherence thereto, the pipe turning on its axis while moving axially for the strip winding, the improvement comprising:

covering the hot seam only, stepwise, by means of sequentially laid plastic strips extending longitudinally on the seam, the strips being laid to melt onto the seam and to form a continuous strip over and along the seam for smoothing surface uneveness of the bead of the seam for smooth interfacing with the strip to be wound for jacketing; the major portion of the pipe remaining uncovered, the covering step carried out prior to said helical winding which covers the entire pipe whereby the helically wound strip smoothly interfaces with the laid-on strips on the seam.

2. In a method as in claim 1, the covering step as carried out stepwise pursuant to pipe rotation and axial advance, being carried out while the seam is still hot from proceeding welding.

3. In a method as in claim 1, the covering step including the stepwise depositing of plastic powder onto the seam.

4. In a method as in claim 1, the covering step including the stepwise depositing of liquidus plastic onto the seam.

5. In a method as in claim 1, the covering step includes providing lengths of segmented tape and stepwise placing said tape longitudinally onto the seam.

6. In a method as in claim 1, including sensing the particular position of the seam, metering a particular amount of powdery plastic for a particular length, and placing the metered amount onto a length of the seam when in the particular position.

7. In a method as in claim 6, the metering step including metering a particular amount of plastic for a length equal to the advance of the pipe for one revolution.

8. In a method as in claim 7, wherein a particular dispensing device is used, the sensing step including feeling the seam position during the rotation, the placing step carried out when the seam has particular position relative to a dispensing device.

References Cited

UNITED STATES PATENTS

| | | | |
|---|---|---|---|
| 3,616,006 | 10/1971 | Landgraf et al. | 156—188 |
| 3,687,706 | 8/1972 | Stanley et al. | 117—21 X |
| 3,290,167 | 12/1966 | Wood et al. | 117—94 X |
| 3,515,614 | 6/1970 | Wolfe | 156—355 X |
| 3,039,428 | 6/1962 | McLean | 118—8 |
| 3,713,862 | 11/1970 | Winkless | 117—94 X |
| 2,602,415 | 7/1952 | Hall | 118—3 |

CHARLES E. VAN HORN, Primary Examiner

D. A. SIMMONS, Assistant Examiner

U.S. Cl. X.R.

117—18, 21, 25; 156—265, 276, 279